(12) United States Patent
Chui et al.

(10) Patent No.: US 12,492,893 B2
(45) Date of Patent: Dec. 9, 2025

(54) PASSIVE ALIGNMENT OF LENS MODULE RELATIVE TO AN IMAGE SENSOR FOR MANUFACTURING A CAMERA MODULE

(71) Applicant: ASMPT SINGAPORE PTE. LTD., Singapore (SG)

(72) Inventors: Ying San Chui, Hong Kong (CN); Kwok Yuen Cheung, Hong Kong (CN); Hei Lam Chang, Hong Kong (CN); Man Wai Chan, Hong Kong (CN); Po Lam Au, Hong Kong (CN)

(73) Assignee: ASMPT SINGAPORE PTE. LTD., Singapore (SG)

( * ) Notice: Subject to any disclaimer, the term of this patent is extended or adjusted under 35 U.S.C. 154(b) by 273 days.

(21) Appl. No.: 17/749,221

(22) Filed: May 20, 2022

(65) Prior Publication Data

US 2023/0400297 A1    Dec. 14, 2023

(51) Int. Cl.
*G01B 11/26* (2006.01)
*G01S 7/497* (2006.01)
(Continued)

(52) U.S. Cl.
CPC .............. *G01B 11/26* (2013.01); *G01S 17/08* (2013.01); *G02B 7/003* (2013.01); *G02B 7/005* (2013.01);
(Continued)

(58) Field of Classification Search
CPC ......... G01B 11/26; G01B 11/27; G01B 11/24; G01B 11/255; G01B 11/272; G01S 17/08;
(Continued)

(56) References Cited

U.S. PATENT DOCUMENTS

| 3,451,607 | A | * | 6/1969 | Miller | ..................... B23K 1/06 |
| | | | | | 257/782 |
| 4,340,166 | A | * | 7/1982 | Bilane | .................. G05B 19/182 |
| | | | | | 228/180.5 |

(Continued)

FOREIGN PATENT DOCUMENTS

| CN | 208350332 U | * | 1/2019 | ............ G01M 11/00 |
| CN | 106679595 B | * | 3/2019 | ............ G01B 11/26 |

(Continued)

OTHER PUBLICATIONS

Notice of Preliminary Rejection mailed Oct. 31, 2024, issued in corresponding Korean Patent Application No. 10-2023-0064915 and its English translation.

*Primary Examiner* — Michael A Lyons
*Assistant Examiner* — Noah J. Haney
(74) *Attorney, Agent, or Firm* — OSTROLENK FABER LLP

(57) ABSTRACT

A camera module is manufactured by attaching a lens module to an image sensor. The lens module includes at least one lens element which has a plurality of centers of curvature. A tilt angle of an imaging axis of the image sensor is determined, and a tilt angle of an optical axis of the lens module is also determined by using an optical device to identify locations of multiple centers of curvature of the at least one lens element included in the lens module. At least one of the lens module and the image sensor are then adjusted accordingly so that the imaging axis and the optical axis are aligned, and thereafter, the lens module is fixedly attached with respect to the image sensor to form the camera module.

19 Claims, 12 Drawing Sheets

(51) Int. Cl.

| | |
|---|---|
| *G01S 17/08* | (2006.01) |
| *G02B 7/00* | (2021.01) |
| *G02B 7/02* | (2021.01) |
| *G02B 27/30* | (2006.01) |
| *G02B 27/62* | (2006.01) |
| *H04N 23/54* | (2023.01) |
| *H04N 23/55* | (2023.01) |
| *G02B 13/16* | (2006.01) |
| *H04N 23/57* | (2023.01) |

(52) U.S. Cl.
CPC .............. *G02B 7/02* (2013.01); *G02B 7/023* (2013.01); *G02B 27/30* (2013.01); *G02B 27/62* (2013.01); *H04N 23/54* (2023.01); *H04N 23/55* (2023.01); *G01S 7/497* (2013.01); *G02B 7/004* (2013.01); *G02B 7/025* (2013.01); *G02B 13/16* (2013.01); *H04N 23/57* (2023.01)

(58) Field of Classification Search
CPC ......... G01S 7/497; G02B 27/30; G02B 7/004; G02B 7/003; G02B 7/005; G02B 7/02; G02B 7/023; G02B 27/62; G02B 7/025; G02B 13/16; H04N 23/54; H04N 23/55; H04N 23/57; B81C 2203/05; B81C 2203/052; B81C 2203/057; G01M 11/0221; G01M 11/0242
USPC .......................................................... 356/138
See application file for complete search history.

(56) References Cited

U.S. PATENT DOCUMENTS

| | | | | |
|---|---|---|---|---|
| 10,171,713 | B1 * | 1/2019 | Toc ........................ | H04N 23/55 |
| 10,293,441 | B2 * | 5/2019 | Kang ...................... | B23P 21/00 |
| 10,861,819 | B1 * | 12/2020 | Deng ................. | H05K 13/0813 |
| 11,650,430 | B2 * | 5/2023 | Hu .......................... | H04N 23/57 |
| | | | | 353/101 |
| 2013/0021617 | A1 * | 1/2013 | Hjelmstrom ....... | G01M 11/0221 |
| | | | | 356/510 |
| 2015/0131175 | A1 * | 5/2015 | Lamontagne .......... | G02B 7/022 |
| | | | | 359/830 |
| 2015/0192750 | A1 * | 7/2015 | Shiraishi ................ | G02B 27/62 |
| | | | | 29/593 |
| 2015/0323416 | A1 * | 11/2015 | Kiontke .................. | G01B 11/25 |
| | | | | 356/127 |
| 2015/0350497 | A1 * | 12/2015 | Gamadia ................ | H04N 23/58 |
| | | | | 348/373 |
| 2016/0061594 | A1 * | 3/2016 | Kim .................... | G01M 11/0214 |
| | | | | 348/302 |
| 2016/0187222 | A1 * | 6/2016 | Oya ....................... | G01M 11/08 |
| | | | | 356/127 |
| 2017/0343831 | A1 * | 11/2017 | Bakin ................ | G02B 27/0012 |
| 2018/0007246 | A1 * | 1/2018 | Shigemitsu ........... | H04N 23/55 |
| 2020/0329181 | A1 * | 10/2020 | Lee ....................... | H04N 17/002 |

FOREIGN PATENT DOCUMENTS

| | | | | | |
|---|---|---|---|---|---|
| JP | 2004240133 | A | * | 8/2004 | ............... G02B 6/42 |
| JP | 2005050854 | A | * | 2/2005 | ............. H01L 21/60 |
| JP | 2007-047586 | A | | 2/2007 | |
| JP | 2007333987 | A | * | 12/2007 | ............... G02B 7/02 |
| JP | 2014089257 | A | * | 5/2014 | ............... G02B 7/02 |
| KR | 20150070678 | A | * | 6/2015 | ............. G02B 7/003 |
| KR | 101549139 | B1 | * | 9/2015 | ............... G02B 7/04 |
| WO | WO 2020/188761 | A1 | | 9/2020 | |

* cited by examiner

PASSIVE ALIGNMENT OF LENS MODULE RELATIVE TO AN IMAGE SENSOR FOR MANUFACTURING A CAMERA MODULE

FIELD OF THE INVENTION

The invention relates to the alignment of a lens module relative to an image sensor, in particular during the assembly and production of a camera module.

BACKGROUND AND PRIOR ART

Active alignment is typically used to align a lens module relative to an image sensor during the assembly of a camera module comprising the lens module and the image sensor. During active alignment, the image sensor inspects an image of a target test chart received through the lens module. When implementing the active alignment process, the image sensor is electrically connected to a circuit board and image capture is initiated. The image sensor may then inspect the target test chart through the lens module at multiple test distances. The disadvantage of active alignment is that it needs an image grabber for alignment, and the image grabber is typically image sensor-dependent, such that different image grabbers are required for different image sensors.

On the other hand, passive alignment may also be used to control tilting of a lens housing and a substrate (on which an image sensor is bonded) to within a tilting tolerance through adjusting an orientation of a bond head with respect to the substrate. In the passive alignment process, a test chart is not required for image capture by the image sensor, and an image grabber is not necessary.

Present passive alignment approaches have the shortcoming that they only adjust the tilting between a lens housing and a substrate. This may be inaccurate since it does not take into account the actual tilting offset between the image sensor itself and the lens elements in the lens module itself.

Although the tilting of each image sensor and lens module may be different, the aforesaid passive alignment approach bonds the lens module to the image sensor without compensating for such potential sources of misalignment. Hence, this has the problem of degrading the assembled camera module's optical performance due to imprecise alignment.

FIG. 1A is a schematic side view of a lens module 10 including a lens housing 12 in which a plurality of lenses 14 are arranged. Solely relying on the levelling of a bond head with respect to a substrate 16, the lens housing 12 has been affixed onto a substrate 16 on which an image sensor 18 is located and bonded. The combination of lenses 14 has an optical axis 20 that is not normal to the substrate 16, even though an opening of the lens housing 12 lies flush on a top surface of the substrate 16. On the other hand, the image sensor 18 has an imaging axis 22 that is substantially perpendicular to a top surface of the image sensor 18.

As shown in FIG. 1A, since the optical axis 20 of the lens module 10 is not normal to the top surface of the substrate 16, the optical axis 20 is not aligned with the imaging axis 22 of the image sensor 18, resulting in image degradation in a camera module comprising the lens module 10 and image sensor 18. To overcome this, the lens housing 12 of the lens module 10 will need to be tilted with respect to the substrate 16 in order to align the said optical axis 20 with the imaging axis 22, as illustrated in FIG. 1B. The lens housing 12 should then be affixed to the image sensor 18 in this tilted orientation where the optical axis 20 and imaging axis 22 have the same tilt angle and direction in order to attain the best image quality in a resulting camera module that is assembled.

It would be beneficial to introduce an approach for cost-effective passive alignment which is more accurate than conventional passive alignment approaches.

SUMMARY OF THE INVENTION

It is thus an object of the invention to seek to provide an improved apparatus and method for passively aligning an image sensor with respect to a lens module, which avoids at least some of the shortcomings of the aforesaid prior art.

According to a first aspect of the invention, there is provided a method for manufacturing a camera module by attaching a lens module to an image sensor, the lens module including at least one lens element, the at least one lens element having a plurality of centers of curvature, the method comprising the steps of: determining a tilt angle of an imaging axis of the image sensor; determining a tilt angle of an optical axis of the lens module by using an optical device to identify locations of multiple centers of curvature of the at least one lens element included in the lens module; adjusting at least one of the lens module and the image sensor so that the imaging axis and the optical axis are aligned; and thereafter fixedly attaching the lens module with respect to the image sensor.

According to a second aspect of the invention, there is provided an apparatus for manufacturing a camera module by attaching a lens module to an image sensor, the lens module including at least one lens element, the at least one lens element having a plurality of centers of curvature, the apparatus comprising: a device for determining a tilt angle of an imaging axis of the image sensor; an optical device for determining a tilt angle of an optical axis of the lens module by identifying locations of multiple centers of curvature of the at least one lens element included in the lens module; a tiltable bond head operative to adjust the lens module relative to the image sensor so that the imaging axis and the optical axis are aligned; and a fixing mechanism operative to fixedly attach the lens module with respect to the image sensor after the said alignment.

It would be convenient hereinafter to describe the invention in greater detail by reference to the accompanying drawings which illustrate specific preferred embodiments of the invention. The particularity of the drawings and the related description is not to be understood as superseding the generality of the broad identification of the invention as defined by the claims.

BRIEF DESCRIPTION OF THE DRAWINGS

An exemplary process for passive alignment of a lens module relative to an image sensor in accordance with the invention will now be described with reference to the accompanying drawings, in which.

DETAILED DESCRIPTION OF THE PREFERRED EMBODIMENT OF THE INVENTION

Figure 1A:
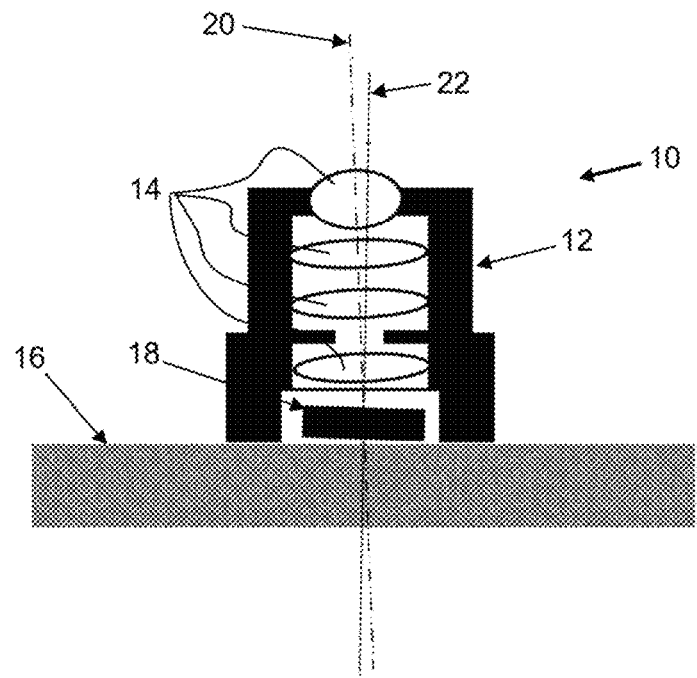
FIGS. 1A and 1B offer schematic side views of a lens module that is misaligned with respect to an image sensor, and illustrate the need to tilt the lens housing so that the lens module is aligned with the image sensor.
Figure 1B:
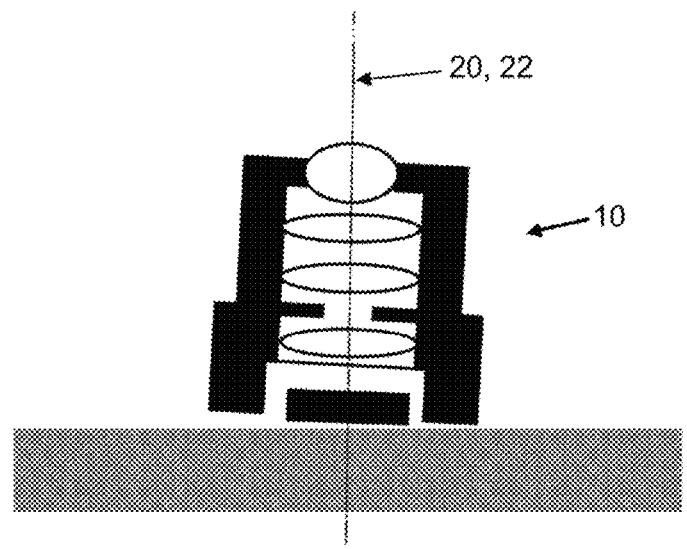
Figure 2A:
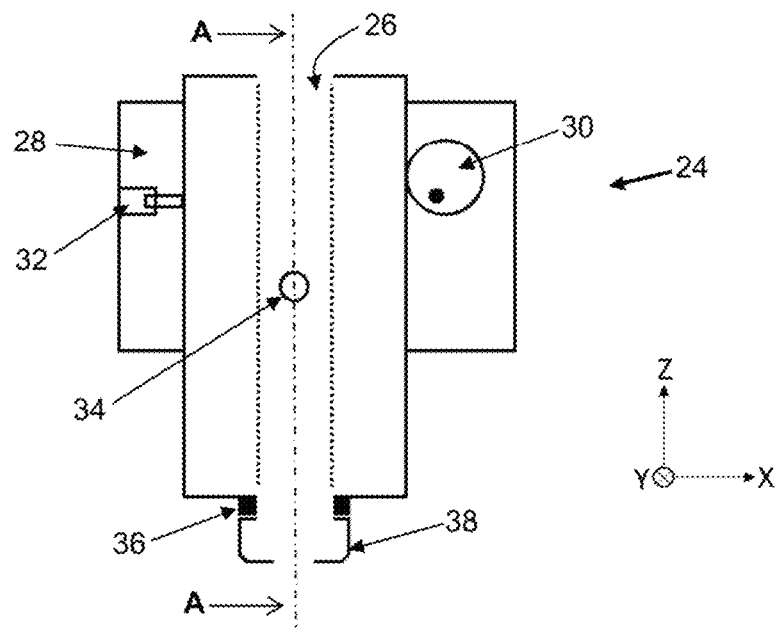
FIGS. 2A and 2B offer schematic side views of a tiltable bond head that may be implemented in one embodiment of the invention.
Figure 2B:
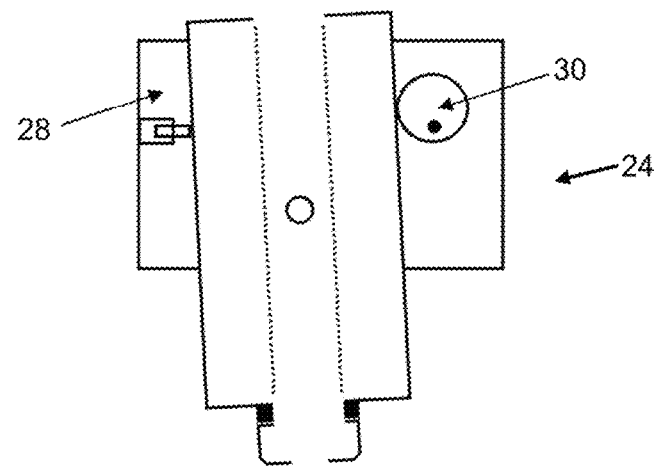

FIGS. 2A and 2B offer schematic side views of a bitable bond head 24 that may be implemented in one embodiment of the invention. The bond head 24 is a programmable multi-axis bond head, such as a six-axis bond head. The bond head 24 has a hollow passage 26 extending through the bond head 24 along a central region of the bond head 24. A pick-up tool 38, which may be in the form of a collet or gripper, is located at a lower end of the bond head 24 for picking up and transferring objects such as electronic devices. The pick-up tool 38 is further mounted or attached onto a rotary motor 36, which is preferably rotatable by 360° and is operative to rotate to adjust an angular orientation of an electronic device which the pick-up tool 38 is holding about the Z-axis. Due to the presence of the hollow passage 26, it is possible to view an object held by the collet 38 from a top of the bond head 24 through the hollow passage 26.

The bond head 24 is installed on a tilting mount 28 which allows the bond head 24 to tilt at various angles about the Y-axis as depicted in FIG. 2B. A motorized eccentric cam 30 contacts the bond head 24, and in cooperation with a tilting preload 32, rotation of the eccentric cam 30 causes tilting of the bond head 24 about a Y-axis pivot point 34. The degree of tilting of the bond head 24 about the Y-axis pivot point 34 is therefore programmable. In FIG. 2B, rotation of the eccentric cam 30 has caused the bond head 24 to tilt in an anti-clockwise direction.

Figure 3A:
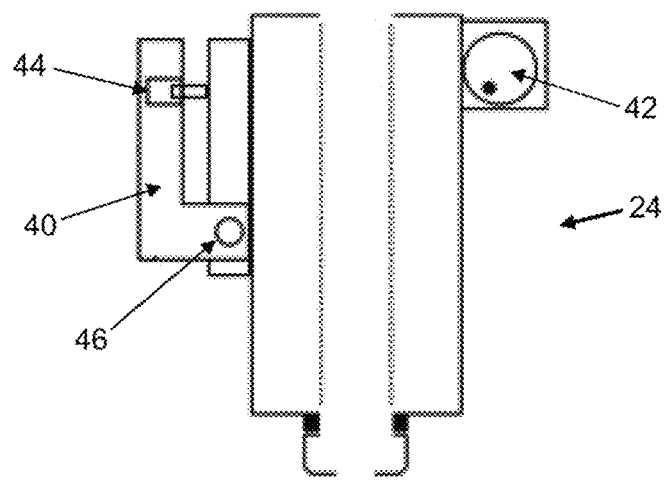
FIGS. 3A and 3B offer schematic side views of the tiltable bond head in FIG. 2A, looking along direction A of FIG. 2A.
Figure 3B:
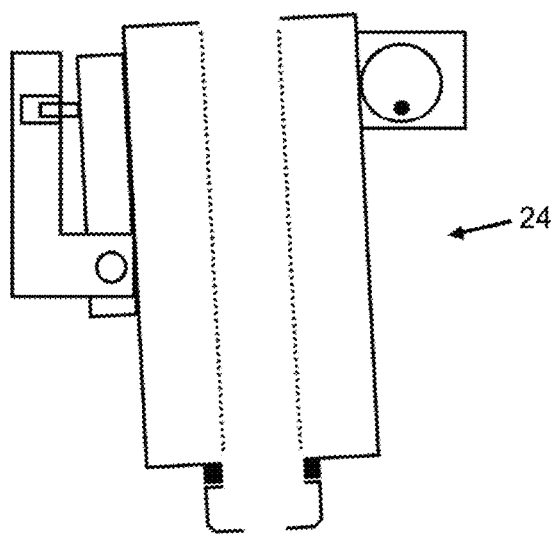

FIGS. 3A and 3B offer schematic side views of the tiltable bond head 24 in FIG. 2A, looking along direction A of FIG. 2A. The bond head 24 is installed on a further tilting mount 40 which further includes another set of motorized eccentric cam 42 and tilting preload 44. Rotation of the second eccentric cam 42 causes the bond head 24 to tilt about an X-axis pivot point 46, as shown in FIG. 3B. Again, the degree of tilting of the bond head 24 about the X-axis pivot point 46 is programmable. The aforesaid arrangements allow the bond head 24 rotate the object held by it about three orthogonal axes (the X, Y and Z-axes), namely to tilt the object about both the X and Y-axes, and to rotate the object about the Z-axis.

Figure 4:
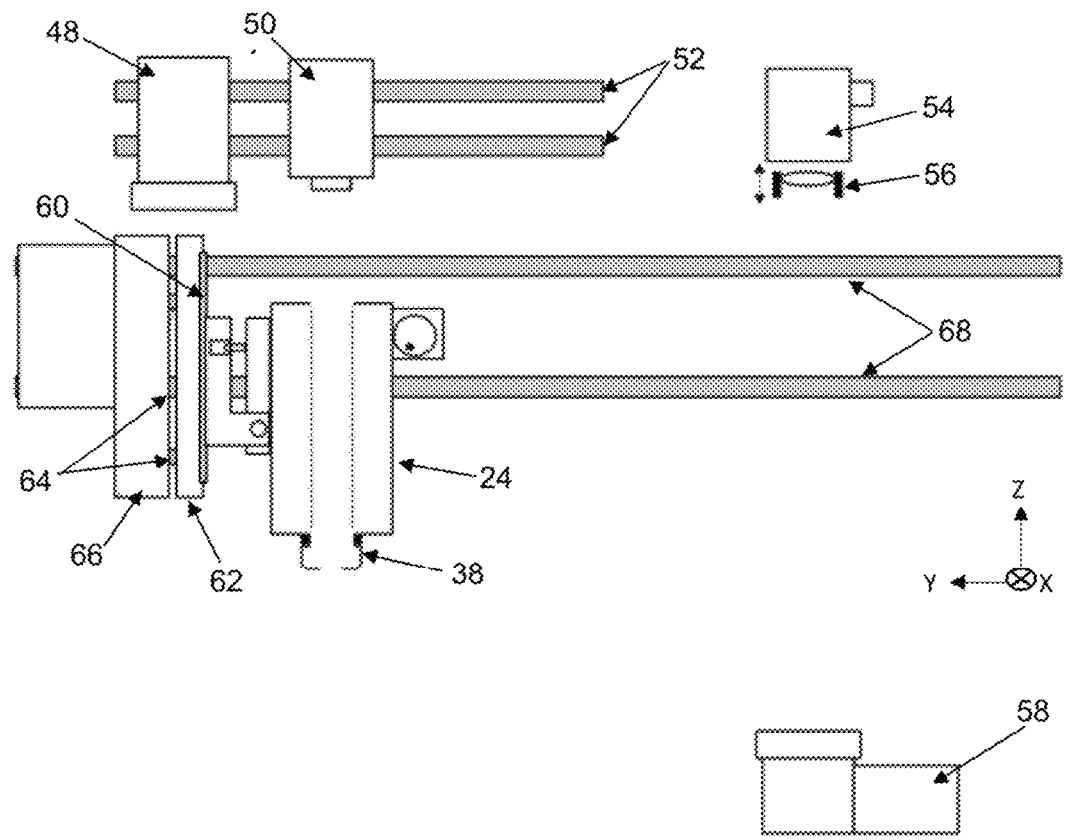
FIG. 4 is an overview of a lens module position alignment and adjustment apparatus according to the preferred embodiment of the invention.

FIG. 4 is an overview of a lens module 10 position alignment and adjustment apparatus according to the preferred embodiment of the invention. The apparatus generally includes a down-look camera 48, a first down-look autocollimator 50 (which comprises a laser), a second down-look autocollimator (which need not comprise a laser) and an up-look optical system 58 which is used for position alignment of a lens module 10 to be bonded. The down-look camera 48 and the first down-look autocollimator 50 are movably mounted on a first set of Y-axis motion guide rails 52. The bond head 24 is movably mounted on a second set of Y-axis motion guide rails 68, a Z-axis guide rail mounting 62 which is mounted on Z-axis motion guide rails 60 and an X-axis guide rail mounting 66 which is mounted on X-axis motion guide rails 64, such combination allowing the bond head 24 to be moved to various positions on the X, Y and Z axes. Also illustrated is a movable focusing lens 56 which is coupled to the second down-look autocollimator 54 to allow the autocollimator 54 to inspect positions at different depths of view.

Figure 5:
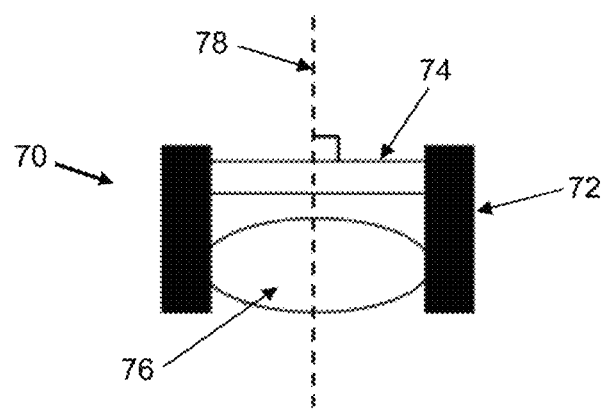
FIG. 5 illustrates an exemplary calibration jig that may be used for calibration of the apparatus shown in FIG. 4.

FIG. 5 illustrates an exemplary calibration jig 70 that may be used for calibration of the apparatus shown in FIG. 4. The calibration jig 70 has a jig housing 72. A transparent plate 74 having a flat surface, and a jig lens 76 incorporating a convex lens having curved surfaces, are arranged in the jig housing 72 in series. The jig lens 76 has a jig lens optical axis 78 which passes normally through a plane of the transparent plate 74.

Figure 6A:
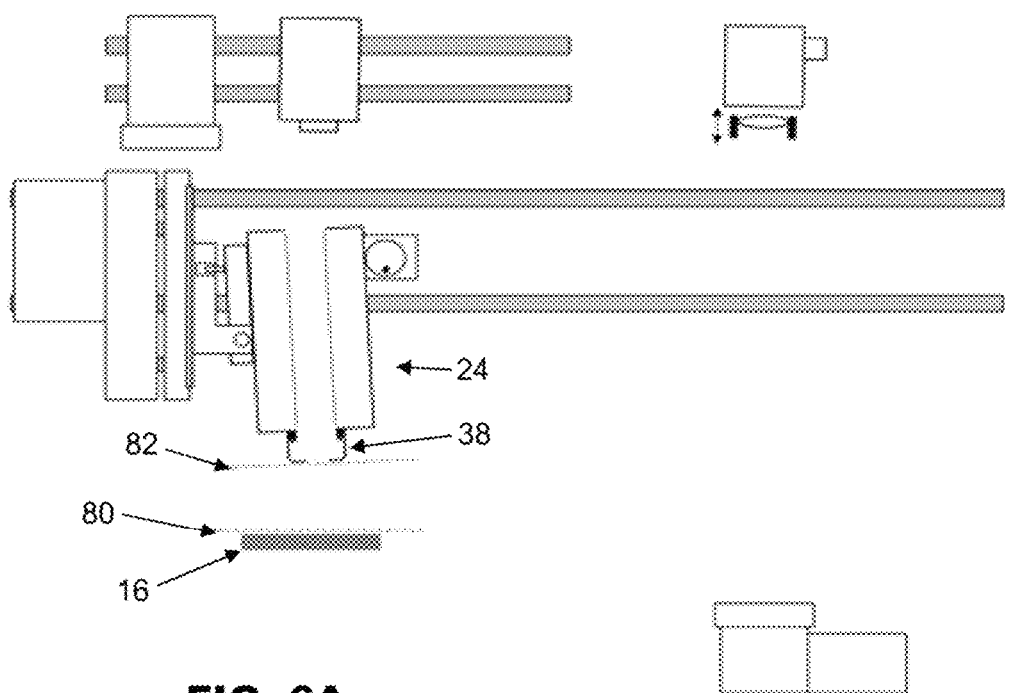
FIGS. 6A and 6B illustrate the bond head before and after tilt adjustment respectively.
Figure 6B:
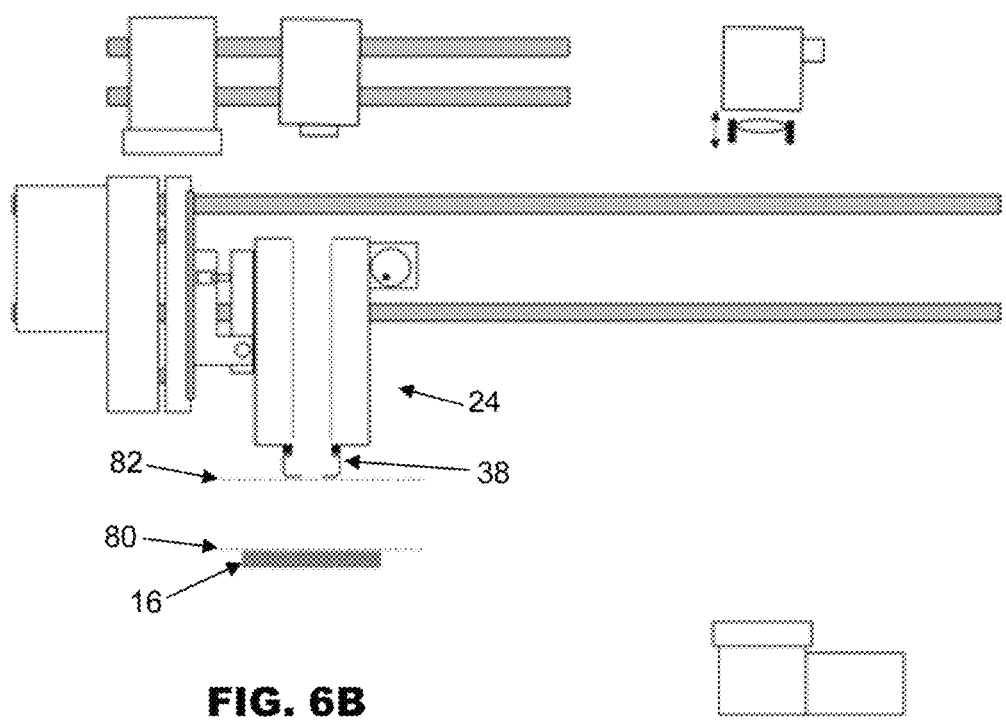

FIGS. 6A and 6B illustrate the bond head 24 before and after tilt adjustment respectively. Tilt adjustment of the bond head 24 is performed so that the horizontal profiles of the bond head 24 and the substrate 16 are the same or parallel. This would define the neutral positions of the eccentric cams 30, 42 when there is no tilting and the bond head is perfectly vertical with respect to the substrate 16. In FIG. 6A, the bond head 24 has been moved to a position over a substrate 16 having a substrate plane 80 which is horizontal. Correspondingly, an opening of the pick-up tool 38 defines a bond head plane 82, which is initially tilted with respect to the substrate plane 80. As shown in FIG. 6B, it is necessary to first adjust the tilted bond head 24 until the bond head plane 82 is substantially parallel to the substrate plane 80.

Figure 7A:
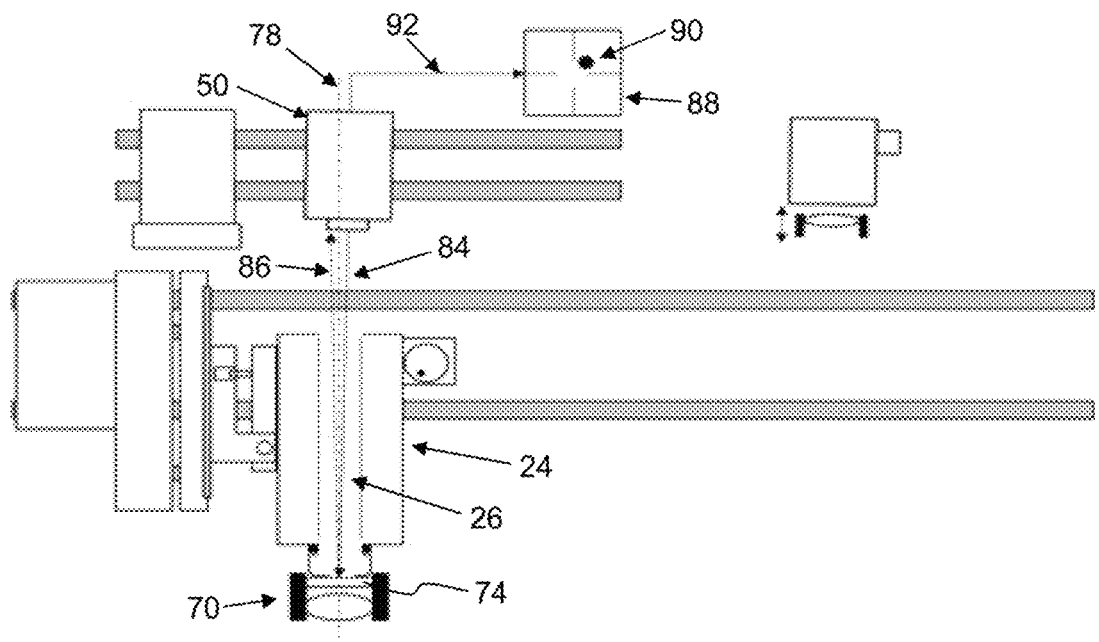
FIGS. 7A and 7B illustrate tilt adjustment of a first down-look autocollimator the bond head utilizing the calibration jig described with reference to FIG. 5.
Figure 7B:
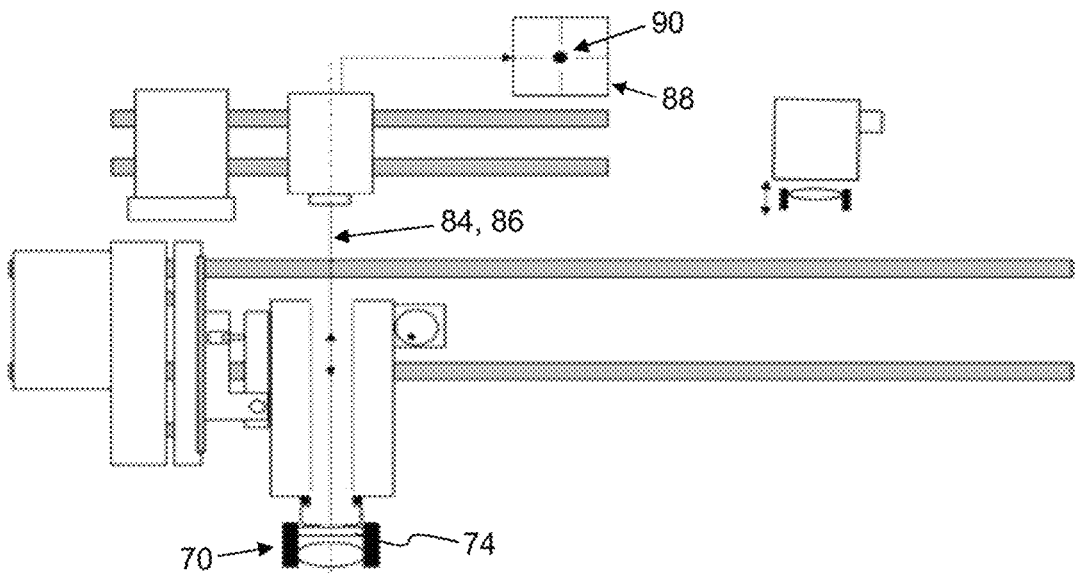

FIGS. 7A and 7B illustrate tilt adjustment of the first down-look autocollimator 50 utilizing the calibration jig 70 described with reference to FIG. 5. The bond head 24 is operated to pick up the calibration jig 70 with the pick-up tool 38, so that the bond head plane 82 is flush with a top surface of the transparent plate 74 of the calibration jig 70. The bond head 24 is then positioned below the first down-look autocollimator 50, so that the first down-look autocollimator 50 has an unobstructed view of the transparent plate 74 via the hollow passage 26.

In FIG. 7A, an incident laser beam 84 from the first down-look autocollimator 50 is directed at the transparent plate 74. Since the jig lens optical axis 78 (which is perpendicular to the top surface of the transparent plate 78) is not aligned with the incident laser beam 84, a reflected laser beam 86 would be received at an offset to the jig lens optical axis 78. A tilt measurement signal 92 is transmitted to a first down-look autocollimator processing unit 88, and a tilt measurement result 90 is determined based on the angle at which the reflected laser beam 86 is received by the first down-look autocollimator 50. The first down-look autocollimator 50 may therefore determine an adjustment angle that is necessary to align the jig lens optical axis 78 with the reflected laser beam 86, by referencing the extent to which the reflected laser beam 86 is offset from a center of tilt coordinates of the tilt measurement result 90.

In FIG. 7B, the orientation of the first down-look autocollimator 50 is adjusted so that the incident laser beam is coincident and aligned with the reflected laser beam 86. Thus, tilt adjustment for the first down-look autocollimator 50 is now completed so that the incident laser beam 84 would be directed perpendicularly or normally to the flat surface of the transparent plate 74, and therefore, to the substrate plane 80.

Figure 8A:
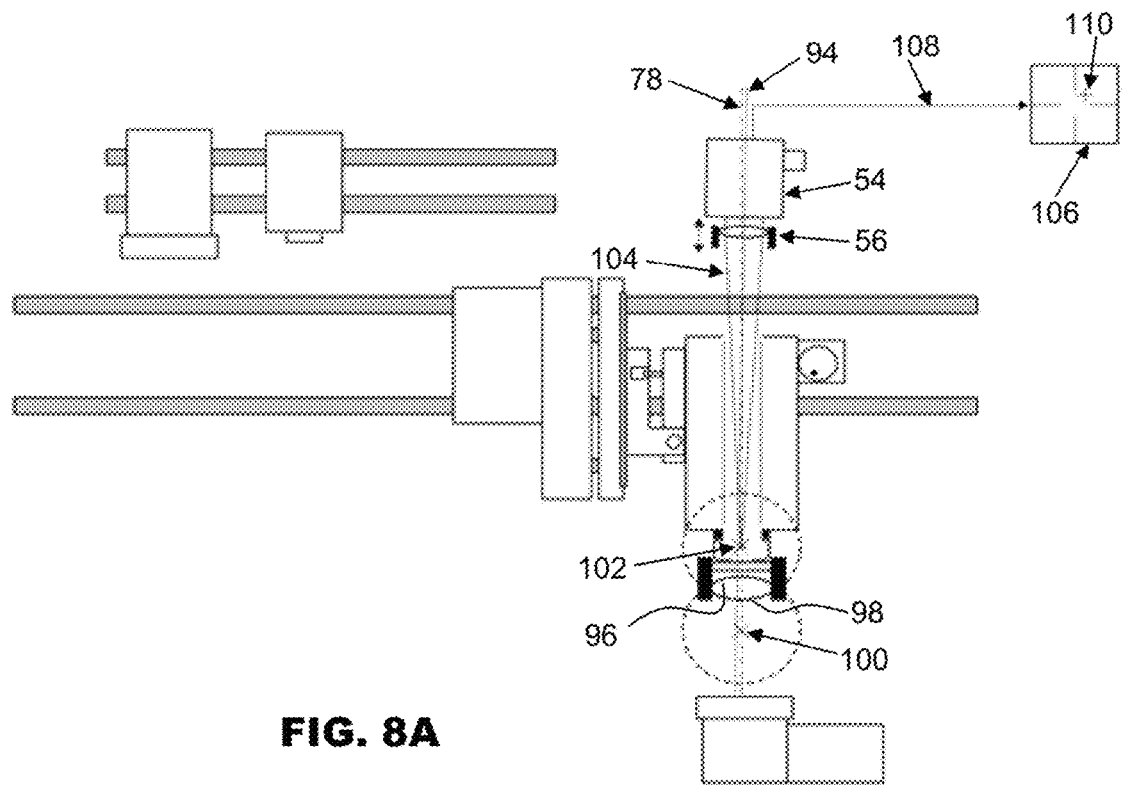
FIGS. 8A and 8B illustrate the adjustment of an orientation of a second down-look autocollimator by using the calibration jig.
Figure 8B:
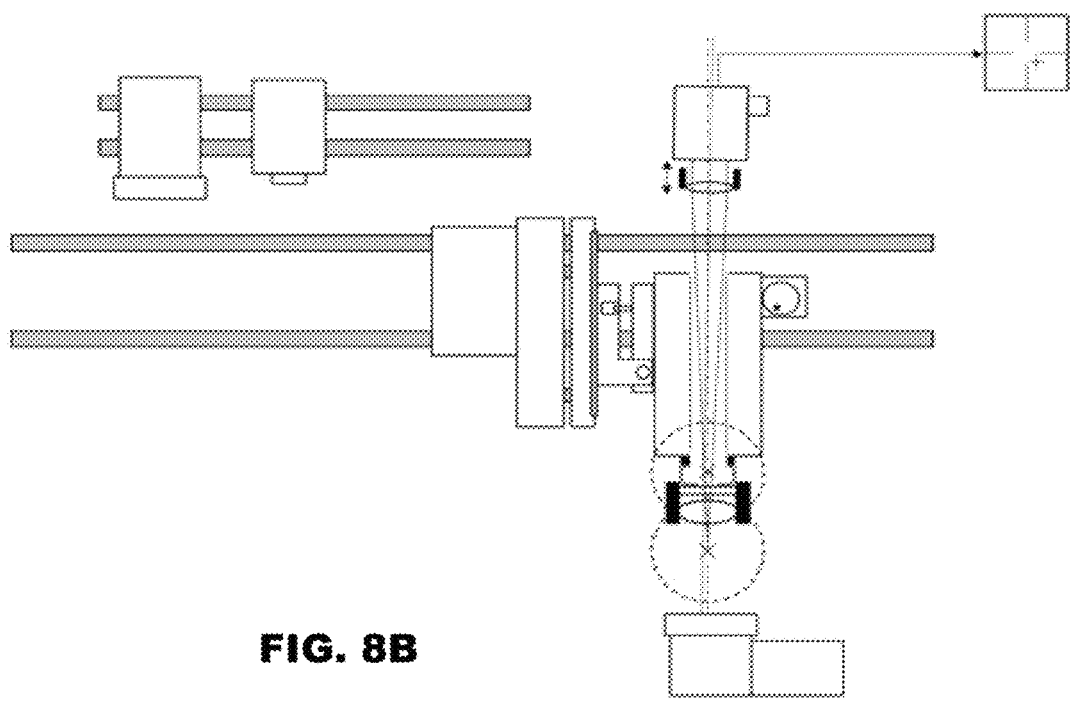

FIGS. 8A and 8B illustrate the adjustment of an orientation of the second down-look autocollimator 54 by using the calibration jig 70. After the preceding adjustments, the jig lens optical axis 78 is now aligned with a vertical axis of the bond head 24. In FIG. 8A, the calibration jig 70 is moved by the bond head 24 to a position under the second down-look autocollimator 54. A second down-look autocollimator viewing axis 94 of the second down-look autocollimator 54 is shown as not being aligned with the jig lens optical axis 78.

At the second down-look autocollimator 54, there are multiple points on the calibration jig 70 that may be used for alignment of the second down-look autocollimator 54 based on a jig lens upper surface 96 and a jig lens lower surface 98 of the jig lens 76. The jig lens upper surface 96 has a corresponding jig lens upper surface center of curvature 100 whereas the jig lens lower surface 98 has a corresponding jig lens lower surface center of curvature 102. The movable focusing lens 56 coupled to the second down-look autocollimator 54 is used to separately focus light rays 104 emanating from both the jig lens upper surface center of curvature 100 and the jig lens lower surface center of curvature 102 onto the second down-look autocollimator 54, and positions of the respective centers of curvature 100, 102 relative to the second down-look autocollimator viewing axis 94 are thereby measured.

During alignment, the movable focusing lens 56 moves to a first position such that light rays 104 emanating from the jig lens lower surface center of curvature 102 are focused onto the second down-look autocollimator 54. A tilt measurement signal 108 is transmitted to a second down-look autocollimator processing unit 106, and a tilt measurement result 110 is determined based on a position offset of the jig lens lower surface center of curvature 102 relative to the second down-look autocollimator viewing axis 94. The movable focusing lens 56 then moves to a second position such that light rays 104 emanating from the jig lens upper surface center of curvature 100 are focused onto the second down-look autocollimator 54. Another tilt measurement signal 108 is transmitted to the second down-look autocollimator processing unit 106, and a further tilt measurement result 110 is determined based on a position offset of the jig lens upper surface center of curvature 100 relative to the second down-look autocollimator viewing axis 94. Based on a nominal straight line passing through the jig lens upper and lower surface centers of curvature 100, 102, a tilting of the second down-look autocollimator viewing axis 94 relative to the jig lens optical axis 78 can be processed and calculated. The second down-look autocollimator 54 may therefore determine an angular adjustment to the second down-look autocollimator 54 that is necessary to align the second down-look autocollimator viewing axis 94 with the jig lens optical axis 78 (represented by the centers of curvature of the curved surfaces of the convex lens).

Thus, the second down-look autocollimator 54 may be aligned with the centers of curvature 100, 102 of the lens surfaces of the jig lens 76 by tilting the second down-look autocollimator viewing axis 94 relative to the jig lens optical axis 78 represented by the respective centers of curvature 100, 102.

Figure 9:
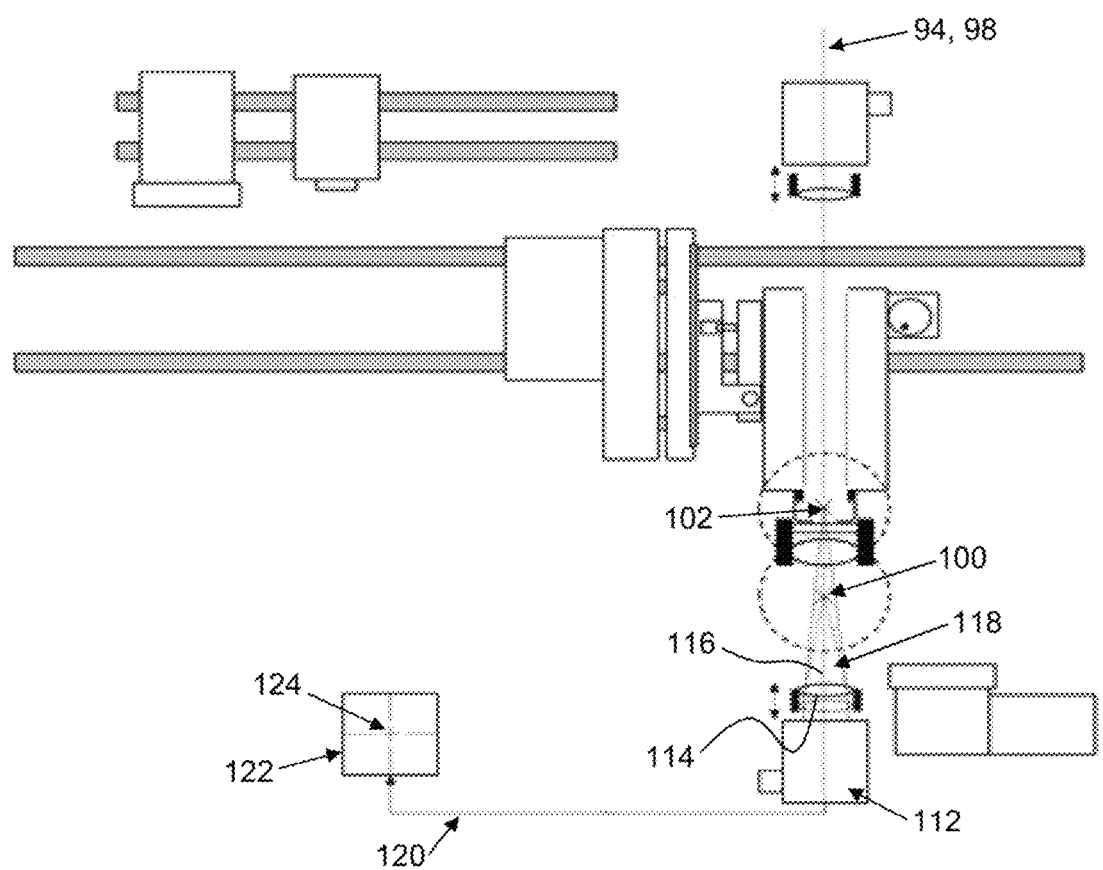
FIG. 9 illustrates adjustment of an orientation of an up-look autocollimator by using the calibration jig.

FIG. 9 illustrates adjustment of an orientation of an up-look autocollimator 112 by using the calibration jig 70. This step is only necessary if an up-look autocollimator 112 is implemented to reduce cycle time and such calibration seeks to align the optical axes of the up-look autocollimator 112 and the second down-look autocollimator 54. A movable focusing lens 114 is coupled to the up-look autocollimator 112 for separately focusing light rays 118 emanating from both the jig lens upper surface center of curvature 100 and the jig lens lower surface center of curvature 102 onto the up-look autocollimator 112, and positions of the respective centers of curvature 100, 102 relative to the up-look autocollimator viewing axis 116 are thereby measured.

During alignment, the movable focusing lens 114 moves to a first position such that light rays 118 emanating from the jig lens lower surface center of curvature 102 are focused onto the up-look autocollimator 112. A tilt measurement signal 120 is transmitted to an up-look autocollimator processing unit 122, and a tilt measurement result 124 is determined based on a position offset of the jig lens lower surface center of curvature 102 relative to the up-look autocollimator viewing axis 116. The movable focusing lens 114 then moves to a second position such that light rays 118 emanating from the jig lens upper surface center of curvature 100 are focused onto the up-look autocollimator 112. Another tilt measurement signal 120 is transmitted to the up-look autocollimator processing unit 122, and a further tilt measurement result 124 is determined based on a position offset of the jig lens upper surface center of curvature 100 relative to the up-look autocollimator viewing axis 116. By identifying an orientation of a straight line passing through the jig lens upper and lower surface centers of curvature 100, 102, a tilt angle of the up-look autocollimator viewing axis 116 relative to the jig lens optical axis 78 can be processed and calculated. The up-look autocollimator 112 may therefore determine an angular adjustment to the up-look autocollimator 112 that is necessary to align the up-look autocollimator viewing axis 116 with the jig lens optical axis 78.

Figure 10A:
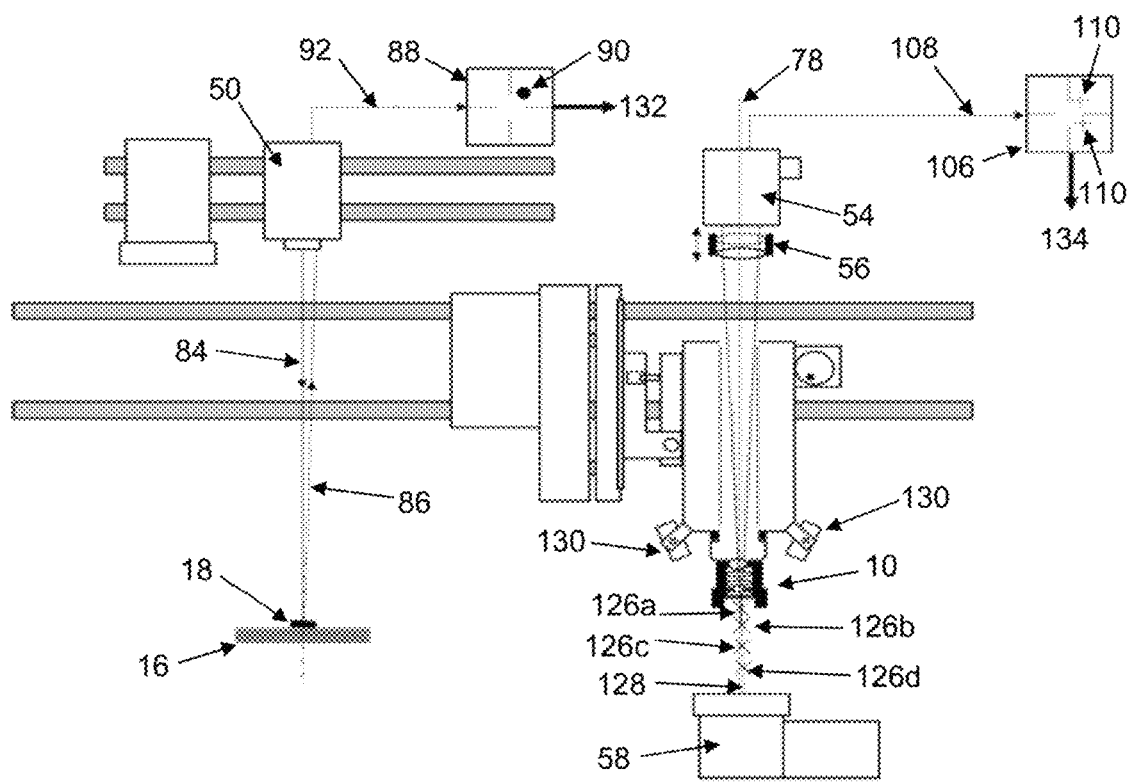
FIGS. 10A and 10B illustrate tilt measurement and adjustment of a lens module relative to an image sensor in accordance with the preferred embodiment of the invention.
Figure 10B:
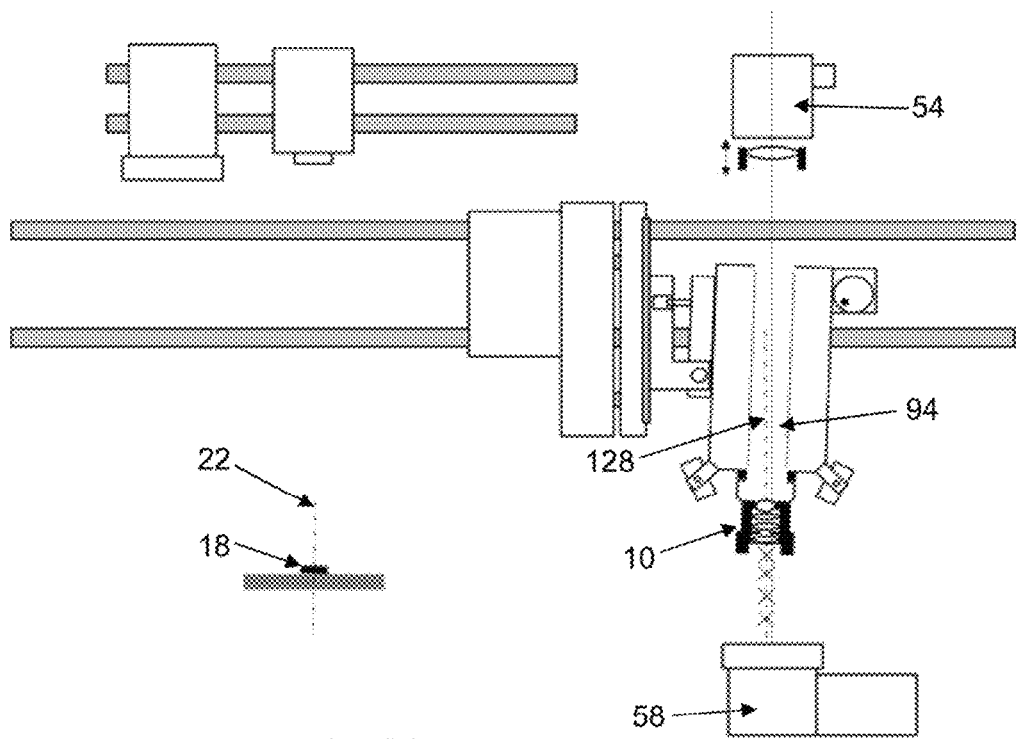

FIGS. 10A and 10B illustrate tilt measurement and adjustment of a lens module 10 relative to an image sensor 18 in accordance with the preferred embodiment of the invention. The bond head 24 first picks up the lens module 10 with its pick-up tool 38, and moves the pick-up tool 38 a location above the up-look optical system 58 for detecting the position of the lens module 10, and positions the lens module 10 precisely below the second down-look autocollimator 54. In this position, the second down-look autocollimator 54 is capable of viewing the lens module 10 and lenses 14 comprised in it through the hollow passage 26.

The second down-look autocollimator 54 then utilizes the second down-look autocollimator processing unit 106 to find positions of multiple centers of curvature 126a-d of the lenses 14 contained in the lens housing 12, using the movable focusing lens 56 to focus light rays 104 emanating from the respective centers of curvature 126a-d onto the second down-look autocollimator 54. Positions of the centers of curvature 126a-d relative to the second down-look autocollimator viewing axis 94 are then measured. The second down-look autocollimator processing unit 106 provides feedback 134 to the bond head 24 for determining an extent of tilt or tilt angle of a lens module optical axis 128 of the lens module 10, by identifying a straight line passing through two or more centers of curvature 126a-d.

At the same time, the first down-look autocollimator 50 projects an incident laser beam 84 onto a top surface of the image sensor 18, and receives a reflected laser beam 86 from the said top surface of the image sensor 18 for determining a tilt angle of an imaging axis 22 of the image sensor 18, which is assumed to be perpendicular to the top surface of the image sensor 18. Feedback 132 is also provided to the bond head 24. Although the first down-look autocollimator 50 is being used for tilt measurement of the image sensor 18 in this embodiment, it should be appreciated that other types of sensors can also be used for this purpose. An example is a laser displacement sensor of a distance measuring device which projects an incident laser onto multiple points on the image sensor 18 for measuring distances between multiple points on the surface of the image sensor 18 to the distance measuring device to find a plane on which the image sensor 18 lies. Other examples are confocal chromatic sensors and interferometers.

Based on a tilt angle of the imaging axis 22 with reference to the top surface of the image sensor 18, the tilt angle of the lens module optical axis 128 can be varied by driving the eccentric cams 30, 42 to adjust the tilt angle of the optical module 10 by tilting the bond head 24 so that the lens module optical axis 128 is parallel to the imaging axis 22 of the image sensor 18, and the respective axes 128, 22 are aligned as shown in FIG. 10B.

Figure 11:
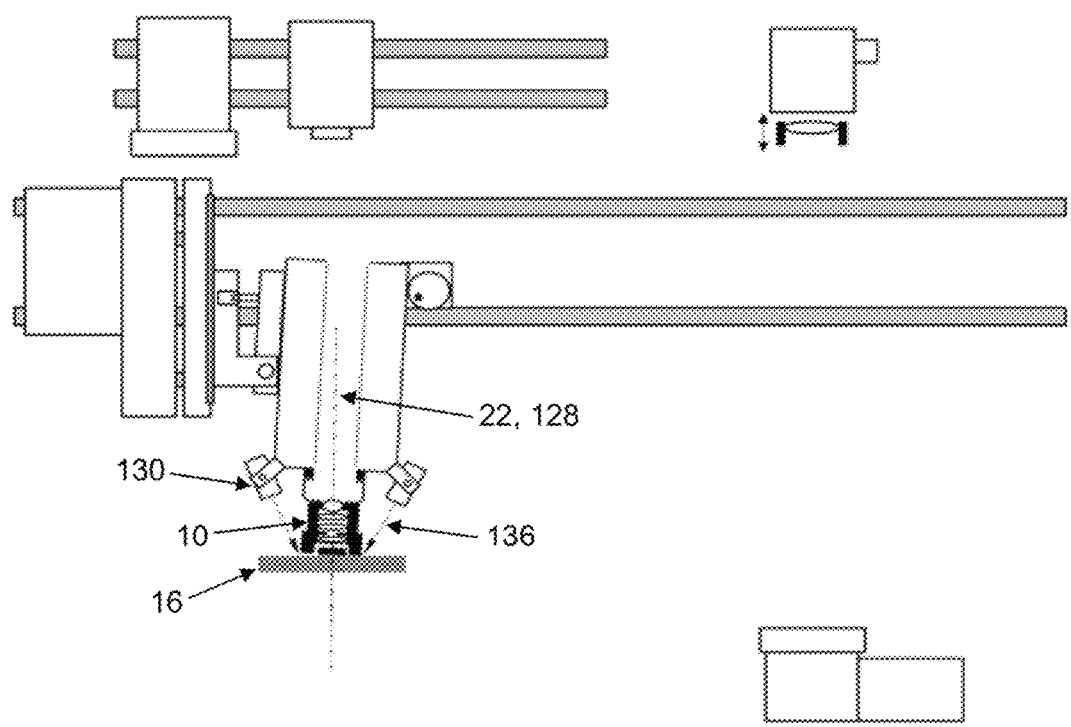
FIG. 11 shows the attachment of the lens module on the substrate, after which an epoxy adhesive is cured to fix the lens module in its aligned position.

FIG. 11 shows the attachment of the lens module 10 on the substrate 16. Prior to attachment, the lens module optical axis 128 has already been aligned to be parallel to the tilt angle of the image sensor 18. An epoxy adhesive is applied to the substrate 16 and the lens module 10 is lowered by the bond head 24 to contact the epoxy adhesive dispensed on the substrate 16. An ultra-violet light module 130 mounted on the bond head 24 is operable to generate ultra-violet rays 136 to snap cure the epoxy adhesive in order to instantly cure the epoxy adhesive so as to fix the lens module 10 in its aligned position with respect to the image sensor 18 on the substrate 16. Apart from ultra-violet energy, other forms of energy sources, such as heat, may be used for snap curing the epoxy adhesive.

Figure 12:
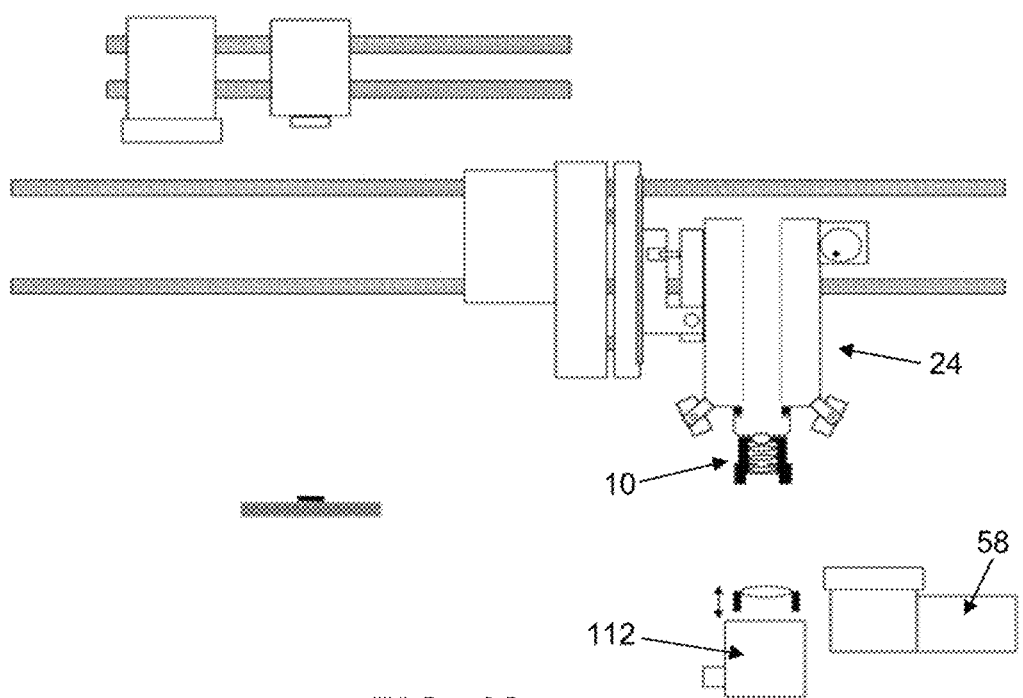
FIG. 12 is a variation of the invention where tilt measurement of the lens module is conducted by an up-look autocollimator.

FIG. 12 is a variation of the invention where tilt measurement of the lens module 10 is conducted by an up-look autocollimator 112. In this embodiment, the lens module 10 is supported by the bond head on a first side of the lens module 10, and the up-look autocollimator 112 is positioned such that it views a second side of the lens module 10 that is opposite to the first side. This approach is especially useful for a bond head 24 which does not have a hollow passage 26. In this variation, the lens module 10 which is held by the bond head 24 is positioned over the up-look autocollimator 112. In this position, the up-look autocollimator 112 instead of the second down-look autocollimator 54 is utilized to find positions of the centers of curvature 126a-d of the lenses 14 contained in the lens housing 12, by using the movable focusing lens 114 to focus the optical beam 104 onto the respective centers of curvature 126a-d. The up-look autocollimator processing unit 122 would provide feedback to the bond head 24 for determining a required tilt of the lens module optical axis 128 of the lens module 10. Based on a tilt angle of the lens module optical axis 128 that is detected, the bond head 24 may be tilted to a corresponding degree so that the lens module optical axis 128 is aligned with the imaging axis 22 of the image sensor 18.

Figure 13:
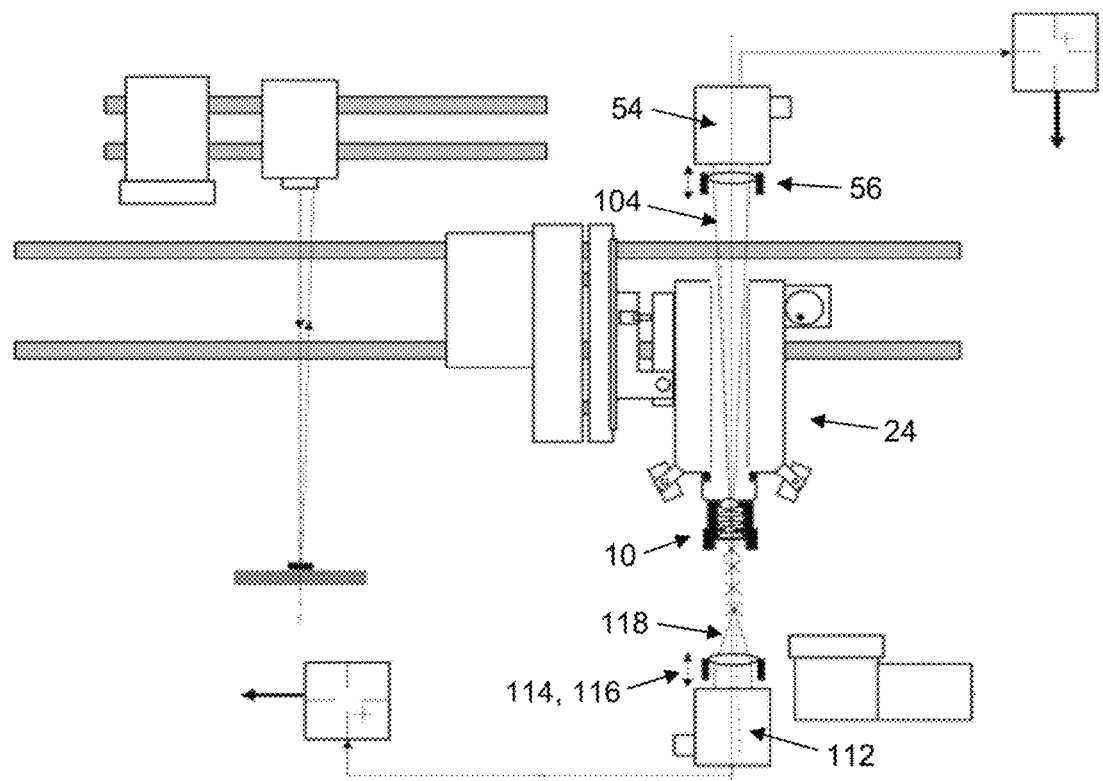
FIG. 13 is another variation of the invention where tilt measurement of the lens module is conducted by an up-look and a down-look autocollimator simultaneously.

FIG. 13 is another variation of the invention where tilt measurement of the lens module 10 is conducted by the up-look autocollimator 112 and the second down-look autocollimator 54 simultaneously. In this approach, the second down-look autocollimator 54 and the up-look autocollimator 112 are located on opposite sides of the lens module 10. The up-look autocollimator 112 will only search for the centers of curvature 126a-d of some of the lenses 14 contained in the lens housing 12, and the second down-look autocollimator 54 will search for the centers of curvature of the remaining lenses at the same time. Hence, the time required for finding the centers of curvature 126a-d of all the lenses 14 will be reduced as the movable focusing lenses 56, 114 need to be moved fewer times during this operation. The time taken may potentially be halved, thereby increasing the system throughput.

Figure 14A:
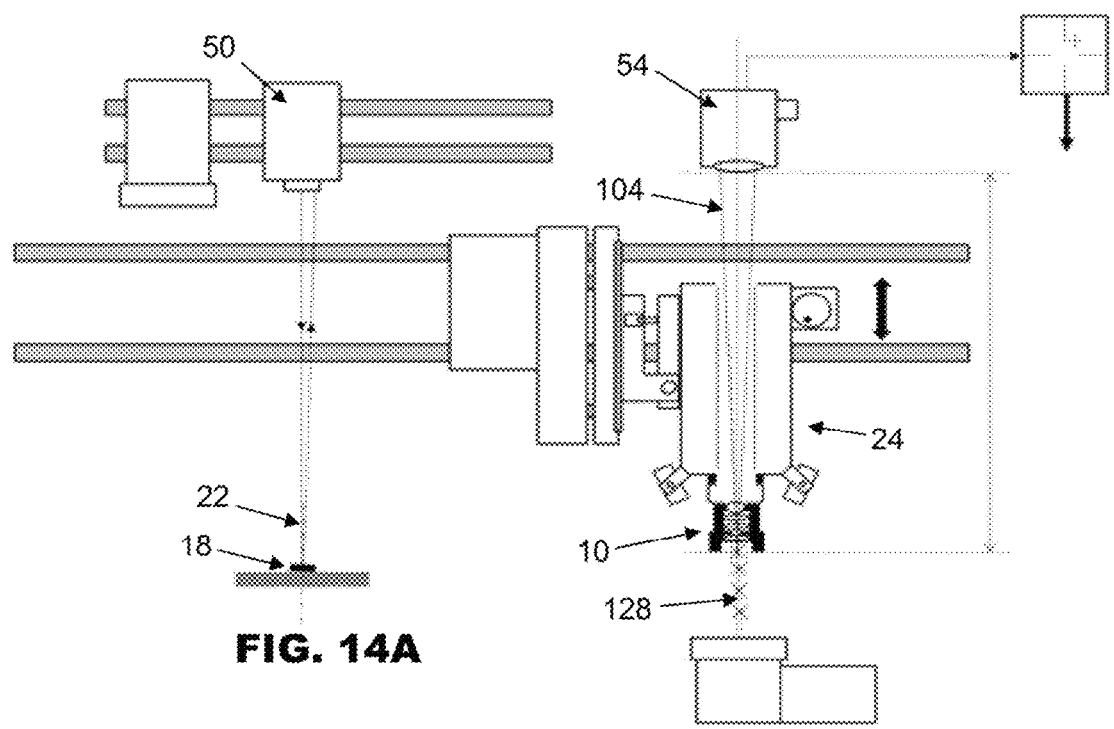
FIGS. 14A and 14B show a further variation of the invention where an autocollimator with a fixed focusing lens is utilized for measuring an extent of tilt of the lens module.
Figure 14B:
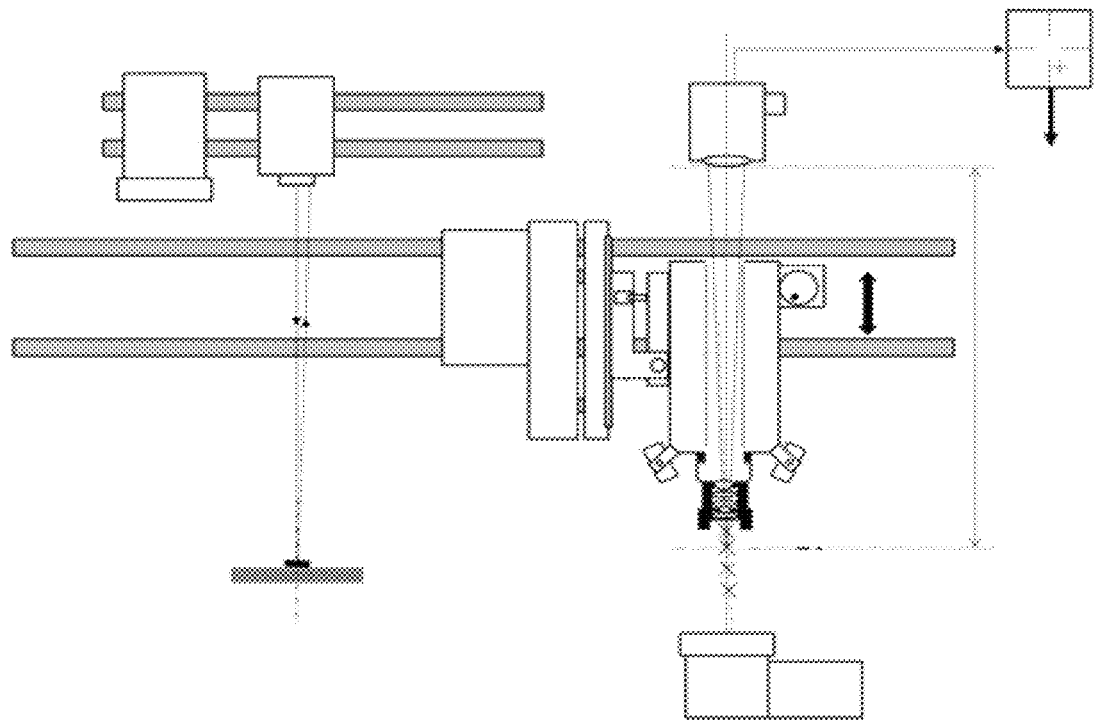

FIGS. 14A and 14B is a further variation of the invention where a second down-look autocollimator 54 with a fixed focusing lens is utilized for measuring an extent of tilt of the lens module 10. Without the movable focusing lens 56 coupled to the second down-look autocollimator 54, the bond head 24 is configured to be movable vertically, so that the bond head 24 may be repositioned at different distances from the second down-look autocollimator 54. In this way, second down-look autocollimator 54 may focus on each of the centers of curvature 126a-d of the lenses 14 contained in the lens housing 12 individually by repositioning the bond head 24 and the lens module 10 it is carrying along the vertical axis. After determining a tilt angle of the lens module optical axis 128, the tilt angle of the lens module optical axis 128 can be varied by tilting the bond head 24 so that the lens module optical axis 128 is aligned with the imaging axis 22 of the image sensor 18. Alternatively, it may be possible to implement a second down-look autocollimator 54 that is movable along the vertical axis, instead of moving the bond head 24.

It should be appreciated that the passive alignment system according to the described embodiments of the invention is able to measure the tilting of an image sensor 18 and a lens module 10, and then uses a programmable multi-axis bond head 24 to actively compensate the relative tilting between the image sensor 18 and the lens module 10. This achieves higher bonding accuracy as compared to a traditional passive alignment process which does not compensate for such relative tilting.

In order to further increase the precision as compared with prior art approaches, a method has been developed to calibrate and correlate a relative tilting between the image sensor 18, lens module 10 and bond head 24 prior to such compensation and alignment. Unlike for active alignment, as no sensor grabber, relay lens and test chart are needed for passive alignment, this enables a universal method that can be used for the alignment of different types of camera packages comprising various combinations of different lens modules and image sensors.

The reduced need for extraneous devices makes this approach more cost effective as compared to traditional active alignment. Moreover, a faster tilt measurement and compensation process is also possible compared to active alignment. In particular, tilt measurement of the lens module 10 can be performed more quickly. For instance, only two measurement points are used to calculate the tilting of the lens module 10, and a single down-look autocollimator 54 may be used for this purpose.

Although the described embodiments show the lens module 10 being held and manipulated by the bond head 24, it may be envisaged that with suitable modifications, the image sensor 18 may instead be held and manipulated by the bond head 24. If so, the image sensor 18 would be adjusted by the bond head 24 in order to align the imaging axis 22 with the lens module optical axis 128.

The invention described herein is susceptible to variations, modifications and/or additions other than those specifically described and it is to be understood that the invention includes all such variations, modifications and/or additions which fall within the spirit and scope of the above description.

The invention claimed is:

1. A method for manufacturing a camera module by attaching a lens module to an image sensor, the lens module including at least one lens element, the at least one lens element having a plurality of centers of curvature, the method comprising the steps of:
    determining a tilt angle of an imaging axis of the image sensor;
    determining a tilt angle of an optical axis of the lens module by using an optical device to identify locations of multiple centers of curvature of the at least one lens element included in the lens module, the optical axis of the lens module being derived by identifying a straight line passing through two or more of the centers of curvature;
    adjusting at least one of the lens module and the image sensor based on the determined tilt angle of the imaging axis of the image sensor and the determined tilt angle of the optical axis of the lens module so that the imaging axis and the optical axis are aligned; and thereafter fixedly attaching the lens module with respect to the image sensor.

2. The method as claimed in claim 1, wherein the lens module or image sensor is held by a tiltable bond head when the tilt angle of the optical axis or imaging axis is being determined, and the step of adjusting at least one of the lens module and the image sensor further comprises tilting the bond head so that the imaging axis and the optical axis are aligned.

3. The method as claimed in claim 2, wherein the bond head is a programmable multi-axis bond head that is operative to tilt the lens module about three orthogonal rotational axes.

4. The method as claimed in claim 2, wherein the bond head includes an eccentric cam and tilting preload coupled to the bond head for tilting the bond head about a rotational axis.

5. The method as claimed in claim 2, wherein the bond head has a hollow passage extending through the bond head, and the step of identifying the locations of the multiple centers of curvature comprises the step of viewing the at least one lens element of a lens module held by the bond head with the optical device through the hollow passage.

6. The method as claimed in claim 2, further comprising moving the bond head is relative to the optical device to reposition the bond head at different distances from the optical device, for the optical device to focus on each of the centers of curvature individually.

7. The method as claimed in claim 1, wherein the step of determining the tilt angle of the imaging axis is conducted by projecting an incident laser that is reflected from a top surface of the image sensor.

8. The method as claimed in claim 7, wherein the incident laser is projected from a distance measuring device onto multiple points on the top surface of the image sensor, to enable the distance measuring device to measure distances between the multiple points on the image sensor and the distance measuring device.

9. The method as claimed in claim 8, wherein prior to determining the tilt angle of the imaging axis, calibrating the distance measuring device using a calibration jig comprising at least a transparent plate having a flat surface.

10. The method as claimed in claim 9, further comprising the step of adjusting the distance measuring device until the laser beam is incident perpendicularly onto the flat surface.

11. The method as claimed in claim 1, wherein the optical device comprises an autocollimator.

12. The method as claimed in claim 11, further comprising the step of sequentially focusing light rays emanating from each of the respective centers of curvature onto the autocollimator using a movable focusing lens coupled to the autocollimator.

13. The method as claimed in claim 11, wherein the lens module is supported on a first side of the lens module, and the autocollimator is positioned such that the autocollimator views a second side of the lens module that is opposite to the first side.

14. The method as claimed in claim 11, wherein prior to determining the tilt angle of the optical axis, calibrating the autocollimator using a calibration jig comprising at least a convex lens having curved surfaces.

15. The method as claimed in claim 14, further comprising the step of adjusting the autocollimator until a viewing axis of the autocollimator is aligned with multiple centers of curvature of the curved surfaces of the convex lens.

16. The method as claimed in claim 14, wherein the calibration jig further includes a transparent plate having a flat surface, and the transparent plate and the convex lens are arranged in series on the calibration jig.

17. The method as claimed in claim 1, wherein the optical device comprises a first autocollimator and a second autocollimator, the first and second autocollimators being located on opposite sides of the lens module.

18. The method as claimed in claim 1, wherein the adjustment to align the imaging axis and the optical axis is conducted by adjusting the optical axis to be parallel to the imaging axis while the image sensor is spaced from the lens module.

19. An apparatus for manufacturing a camera module by attaching a lens module to an image sensor, the lens module including at least one lens element, the at least one lens element having a plurality of centers of curvature, the apparatus comprising:
    a device for determining a tilt angle of an imaging axis of the image sensor;
    an optical device for determining a tilt angle of an optical axis of the lens module by identifying locations of multiple centers of curvature of the at least one lens element included in the lens module, the optical axis of the lens module being derived by identifying a straight line passing through two or more of the centers of curvature;
    a tiltable bond head operative to adjust the lens module relative to the image sensor based on the determined tilt angle of the imaging axis of the image sensor and the determined tilt angle of the optical axis of the lens module so that the imaging axis and the optical axis are aligned; and
    a fixing mechanism operative to fixedly attach the lens module with respect to the image sensor after the said alignment.

* * * * *